July 18, 1933.　　　　C. GERBEN　　　　1,918,694

EMERGENCY TIRE FOR VEHICLES

Filed Oct. 20, 1932

INVENTOR-
Charles Gerben
BY
Francis E. Boyce
ATTORNEY-

Patented July 18, 1933

1,918,694

UNITED STATES PATENT OFFICE

CHARLES GERBEN, OF NEW YORK, N. Y.

EMERGENCY TIRE FOR VEHICLES

Application filed October 20, 1932. Serial No. 638,712.

This invention relates to improvements in emergency tires for vehicles, the principal object of the invention being to provide a tire which can be quickly and easily placed in position to take the weight of the vehicle off a deflated or flat tire and permit the vehicle to continue on its way without stopping to change the flat and without risk of damaging the latter.

The present invention is an improvement on that shown and described in Letters Patent of the United States No. 1,733,959, granted to me under date of October 29, 1929, one of the objects of the invention being to simplify the structure and to reduce the time necessarily consumed in applying it to a vehicle wheel.

Other objects and advantages of the invention will appear as the description proceeds.

In the drawing accompanying this specification,

Figure 1:
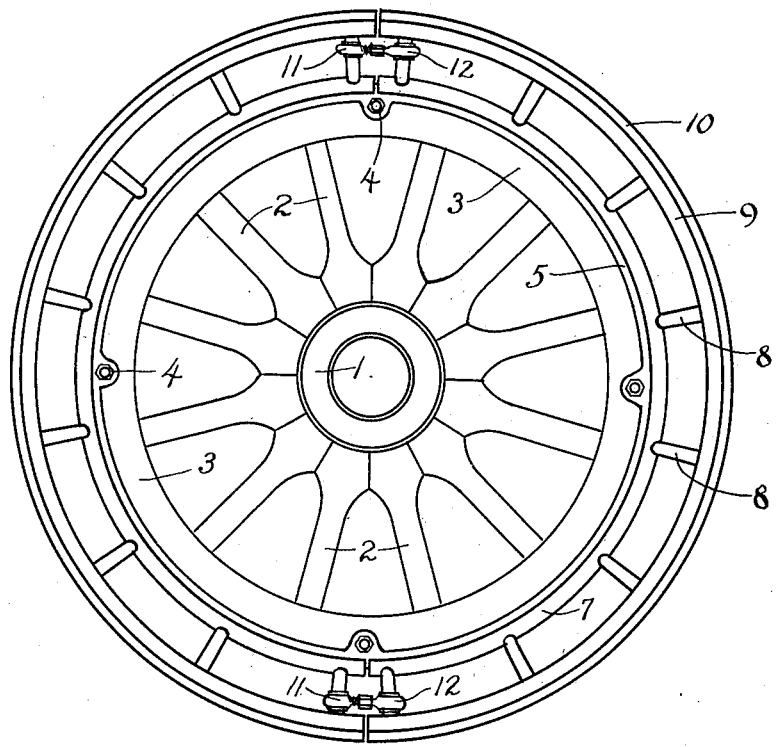
Fig. 1 is a side elevation of a vehicle wheel with the improved emergency tire applied thereto.

Referring to the drawing, the vehicle wheel is of usual construction and comprises a hub 1, spokes 2 and a felly 3, on which is secured by means of bolts 4 the usual metal rim 5 carrying a shoe or casing 6 for housing the well-known inflatable inner tube, not shown, all of said members being common and well-known.

Figure 3:
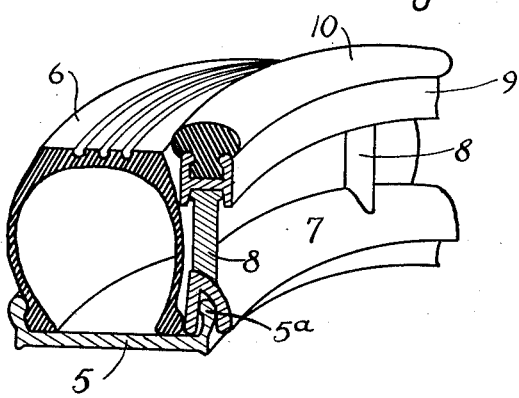
Fig. 3 is a partly sectional perspective view of a portion of the tire rim and tire of a vehicle wheel with the emergency tire in position thereon.

The emergency tire forming the subject-matter of the present invention comprises an annular member or rim made up of a plurality of sectional members 7 of approximately V or channel shape in cross section, whereby the said members are adapted to straddle the side flange 5ª of the tire rim 5, as shown clearly in Fig. 3. Extending radially from the periphery of each of the members 7 are a plurality of short spokes 8, upon the outer ends of which is supported a rim-forming member 9, in which is mounted a section of a solid rubber tire 10. Thus, the complete emergency tire is made up of a plurality of units, shown herein as two, each comprising an inner rim section 7, an outer rim section 9 and a section of solid rubber tire 10 secured in said outer rim section, the inner and outer rim sections being connected together by spokes 8, which serve to space apart the rim sections and to form a solid support for the outer rim section.

Figure 2:
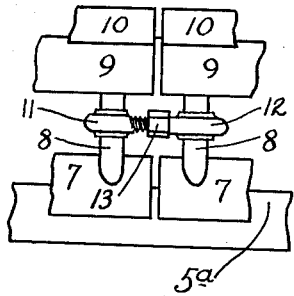
Fig. 2 is a broken away detail view illustrating the manner in which the sections of the emergency tire are connected together when in use.

The units above described are provided with means for connecting them together at their abutting ends thereby to form a complete tire. Such means is shown herein as comprising short studs 11 and 12 swivelled on the end spokes of abutting sections, one of said studs, as 11, being exteriorly threaded and the other, as 12, having a nut 13 swivelled thereon for engagement with the stud 11, as shown clearly in Figs. 1 and 2.

The operation of the device is very simple. When the driver of the vehicle discovers that one of his tires is flat, he places the emergency tire units in position with their V-shaped rim members 7 in straddling engagement with the outer flange 5ª of the tire rim 5 and locks the units together by engagement of the nuts 13 with the studs 11, said nuts being turned until the units are drawn together and into tight engagement with the tire rim. The overall distance between the apex of the V sections and the outer surface of the solid tire 10 is intended to be such that the emergency tire will take the weight of the vehicle so that it may continue on its way without injury to the flat tire and may be safely driven on the emergency tire until the "flat" can be conveniently fixed. It will thus be seen that I have considerably simplified the attachment of the device to the wheel, since it is necessary merely to place the units in position and tighten the nuts 13 on the studs 11, it being unnecessary even to use a jack, as one unit may be placed on the front part of the wheel and the vehicle caused to roll forward sufficiently to ride up on said unit, the other unit being then placed in position and secured as above stated.

It will be understood that while I have shown the emergency tire herein as comprising only two units, it may be made up of as many units as may be found desirable without departing from the spirit and scope of the invention. It will also be understood that I do not limit my invention to the precise form of securing means herein shown, since the studs 11 and 12 may be in the form of snap fasteners if desired.

I am aware that many attempts have been made to provide emergency tires to take the place of pneumatic tires that may have become punctured while out on the road. However, in none of the devices of this character with which I am familiar is the emergency tire when in use disposed directly in vertical or radial alinement with the edge or flange of the permanent rim on which the device is supported. In all prior devices at all similar to mine of which I have any knowledge, the circumferential center line of the emergency tire is in a plane at one side of and parallel with, and in some cases quite remote from, the plane of the permanent rim. This disposition of the device imposes on the supporting rim a severe lateral strain which is very apt to cause the supporting edge to break away from the rim.

In the device herein illustrated and described, it will be readily seen that when the device is in use it is disposed in absolute radial alinement with the edge of the permanent rim on which it is supported, thereby eliminating any undue strain on said rim and exerting thereon only a direct pressure in a direction radially of the tire.

Having thus described my invention, what I claim is:

1. The combination with a vehicle wheel having a flanged tire rim, of an emergency tire comprising means for engaging one of the flanges of said rim, road-engaging means supported on and radially spaced from said rim-engaging means, said road-engaging and rim-engaging means being in direct radial alinement with each other and with the supporting flange, and means for securing said rim-engaging means in position on said flange.

2. An emergency tire, comprising a plurality of units each having an inner rim-forming section of V-shape in cross section, a plurality of spokes extending radially from said rim-forming section, an outer rim-forming section carried by said spokes in radial alinement with its inner section, a flexible tread-forming section carried by said outer section, a threaded stud mounted for swiveling movement on the spoke at one end of each unit, and a nut carried by the spoke at the adjacent end of a companion unit for engagement with said stud thereby to secure the units together in tire-forming relation.

CHARLES GERBEN.